US012770544B2

(12) United States Patent
Kazanbas et al.

(10) Patent No.: US 12,770,544 B2
(45) Date of Patent: Oct. 20, 2026

(54) DISPLAY SYSTEM

(71) Applicant: Tusas- Turk Havacilik Ve Uzay Sanayii Anonim Sirketi, Kahramankazan (TR)

(72) Inventors: Mehmet Cemil Kazanbas, Kahramankazan (TR); Cemalettin Albayrak, Kahramankazan (TR)

(73) Assignee: Tusas- Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 0 days.

(21) Appl. No.: 19/138,113

(22) PCT Filed: Nov. 13, 2023

(86) PCT No.: PCT/TR2023/051313
§ 371 (c)(1),
(2) Date: Jun. 12, 2025

(87) PCT Pub. No.: WO2024/129028
PCT Pub. Date: Jun. 20, 2024

(65) Prior Publication Data

US 2026/0204196 A1 Jul. 16, 2026

(30) Foreign Application Priority Data

Dec. 12, 2022 (TR) ............................... 2022/019059

(51) Int. Cl.
*G09G 3/20* (2006.01)
*G09G 3/32* (2016.01)

(52) U.S. Cl.
CPC ............ *G09G 3/2003* (2013.01); *G09G 3/32* (2013.01); *G09G 2340/06* (2013.01); *G09G 2360/02* (2013.01); *G09G 2380/12* (2013.01)

(58) Field of Classification Search
None
See application file for complete search history.

(56) References Cited

U.S. PATENT DOCUMENTS

2007/0218428 A1 9/2007 Taffet
2013/0027279 A1 1/2013 Peacock
(Continued)

FOREIGN PATENT DOCUMENTS

CN 203691533 7/2014
WO WO 2019/090139 * 5/2019

OTHER PUBLICATIONS

International Search Report and the Written Opinion Dated Mar. 7, 2024 From the International Searching Authority Re. Application No. PCT/TR2023/051313. (13 Pages).
(Continued)

*Primary Examiner* — Christopher J Kohlman

(57) ABSTRACT

The present invention relates to at least one screen (2) located at an air and/or space vehicle, and allowing flight data and/or control indicators to be displayed thereon, wherein a day mode or a night mode is created on the screen (2) at a predetermined wavelength value; at least one programmable logic tool (3) located in connection with the screen (2), enabling the flight data to be displayed on the screen (2) in day mode or night mode when the user switches to day mode or night mode, and enabling the wavelength values of the pixels on the screen (2) to be determined in the RGB color space.

8 Claims, 3 Drawing Sheets

(56) References Cited

U.S. PATENT DOCUMENTS

| | | | | |
|---|---|---|---|---|
| 2015/0070337 | A1* | 3/2015 | Bell | G09G 3/2003<br>345/82 |
| 2015/0214281 | A1 | 7/2015 | Hack et al. | |

OTHER PUBLICATIONS

Desjardins et al. "Military Display Performance Parameters", Head- and Helmet-Mounted Displays XVII; and Display Technology and Applications for Defense, Security, and Avionics VI, XP060003080, Proceedings of SPIE Defewnse, Security, and Sensing, Baltimore, Maryland, USA, 8383(1): 838310-1-838310-44, May 23, 2012.

* cited by examiner

DISPLAY SYSTEM

RELATED APPLICATIONS

This application is a National Phase of PCT Patent Application No. PCT/TR2023/051313 having International filing date of Nov. 13, 2023, which claims the benefit of priority of Turkey Patent Application No. 2022/019059 filed on Dec. 12, 2022. The contents of the above applications are all incorporated by reference as if fully set forth herein in their entirety.

FIELD AND BACKGROUND OF THE INVENTION

This invention relates to adjustment of avionic displays in air and/or space vehicles to be suitable for day and night flights.

Standard ground lighting is used for night flights in avionic displays or LED (light emitting diode) indicators used in the cockpits of air and/or space vehicles. With the hardware LED compatible with the standards for night flight, the display is illuminated with a light intensity and wavelength of a predetermined night vision imaging system (NVIS) in accordance with military standards. Therefore, using NVIS compatible hardware LED filtering equipment, an image transmitted from central computer systems in the air vehicle to the avionic displays is displayed NVIS-compliant according to the standards. Additionally, hardware structures ensure that all lighting and LCD-containing structures in the cockpit comply with military standards in order to prevent any radiation that will affect the user in night vision mode.

US2007218428A1, which is included in the known-state of the art, discloses apparatus and studies to improve night vision in the cockpit of an air vehicle. Said patent document discloses an NVG mode on/off mode for the screens in the cockpit, and as a result of the operations performed in the processor with a command provided by the pilot, required modifications are performed on the LEDs as output, providing the field of view desired by the pilot.

CN203691533U, which is included in the known-state of the art, discloses video processor, camera and night vision system on a vehicle. Said document discloses capability of video processor to process the received image, such that improvements are made suitable for night use. The document refers to acquisition of an image by a camera or video recorder, with improvements made to that image to improve night vision.

SUMMARY OF THE INVENTION

Thanks to a display system according to the present invention, air vehicles are provided with a less costly display system for night mode.

Another object of the invention is to enable the use of avionic LCDs in compliance with standard requirements in night vision through digital design, without the need for a hardware structure.

A further object of the invention is to provide a more time-effective viewing to avionic displays on air vehicles in night mode, without any hardware structures.

The display system realized to achieve the object of the present invention, which is defined in the first claim and other claims dependent thereon, comprises at least one screen located in a cockpit of an air and/or space vehicle, and on which flight data, control indicators or flight-related data from an external source are reflected for the pilot. The screen can be converted by the pilot user to be used in day mode or night mode in predetermined wavelength ranges. The display system comprises at least one programmable logic tool within the screen. Thanks to the programmable logic tool, when the air and/or space vehicle is switched to a day mode by the user, the data transferred by the central avionics computer is displayed on the screen in accordance with the day mode; and when the air and/or space vehicle is switched to a night mode, the data is displayed on the screen in accordance with the night mode. Wavelength coordinate values of almost each pixel to be reflected on the screen are determined in the RGB (red-green-blue) color space by means of the programmable logic tool.

The display system according to the invention comprises the programmable logic tool that enables the conversion of wavelength values determined in RGB color space for each pixel into CIE 1976 UCS (U',V'—color, brightness) space when the air and/or space vehicle is switched from day mode to night mode by the user. By means of the programmable logic tool, average of the wavelength values of the pixels converted to CIE 1976 UCS color space and the reference wavelength values on the chromatic diagram are calculated. The display system comprises the programmable logic tool that converts the new wavelength values of the pixels, which are averaged and correlated within the reference wavelength range on the chromatic diagram, back into RGB color space and allows them to be reflected on the screen through image processing.

In an embodiment of the invention, the display system comprises the programmable logic tool that detects when the air vehicle is switched from day mode to night mode, after the air and/or space vehicle has been switched from day mode to night mode by the user. As a result of detecting the mode change, by means of the programmable logic tool, wavelength values are determined according to the chromatic coordinates in the RGB color space of almost each pixel value of the data transferred from the central avionics computer. Pixels with a wavelength determined on the chromatic coordinate axis in the RGB color space are converted by the programmable logic tool to be positioned on the chromatic coordinate axis in the CIE 1976 UCS space. Average of the wavelength values of the pixels in CIE 1976 UCS space and the reference wavelength values predetermined by the manufacturer are calculated, so that pixels on the chromatic coordinate axis according to wavelength values in CIE 1976 UCS space are brought to the reference wavelength value range predetermined by the manufacturer in CIE 1976 UCS space. As a result of calculating the average, the pixel wavelength values, which are brought to the reference wavelength value range predetermined by the manufacturer in the CIE 1976 UCS space, are converted back into the wavelength values that will be included in the chromatic diagram in the RGB color space, via a programmable logic tool. The wavelength values corresponding to the wavelength coordinate values in the RGB color space, which are correlated according to the reference color and brightness values in the CIE 1976 UCS space, are determined and converted into RGB color space. Therefore, the display system comprises the programmable logic tool that allows almost each pixel containing the data transmitted by the central avionics computer in night mode to be reflected on the screen by image processing through a color adaptation algorithm, with a wavelength in the RGB color space in the predetermined reference range.

In an embodiment of the invention, the display system comprises the programmable logic tool that detects when the air and/or space vehicle is switched from day mode to night mode by the user, and accordingly, allows the flight data transmitted in the central avionics computer to be reflected on the screen within the night mode wavelength range predetermined by the manufacturer, by running the color adaptation algorithm In an embodiment of the invention, the display system comprises the programmable logic tool that creates pixels at the CIE 1976 UCS space reference wavelength predetermined by the manufacturer by simply running the color adaptation algorithm, without using any external hardware lighting device (backlight/lighting filter), with the flight data transmitted from the central avionics computer when the air and/or space vehicle is switched from day mode to night mode, thereby allowing them to be displayed on the screen. The color adaptation algorithm is run by means of the programmable logic tool such that the predetermined night mode reference wavelength values correspond to any of the values of the white night vision imaging system (NVIS White, u'=0.190, v'=0.49, r=0.04), green night vision imaging system (NVIS Green A, u'=0.088, v'=0.543, r=0.037/ NVIS Green B, u'=0.131, v'=0.623, r=0.057), yellow night vision imaging system (NVIS Yellow, u'=0.274, v'=0.622, r=0.083) or red night vision imaging system (NVIS Red, u'=0.450, v'=0.550, r=0.060).

In an embodiment of the invention, the display system comprises the color adaptation algorithm run by the programmable logic tool consisting solely of a field-programmable gate array (FPGA).

In an embodiment of the invention, the display system comprises the programmable logic device, which is an FPGA with a color adaptation algorithm created using hardware description language (HDL). When the air and/or space vehicle is switched to night mode by means of the programmable logic tool, pixels on the screen can be created with a wavelength value range predetermined by the manufacturer, and displayed on the screen by the user.

In an embodiment of the invention, the display system comprises the screen in the cockpit that allows the user to view flight data, which is any of a liquid crystal display (LCD), large area display (LAD), multi-function display (MFD), head-up display, or integrated matrix device (IMD).

In an embodiment of the invention, the display system comprises the programmable logic tool which, when the air and/or space vehicle is switched to night mode by the user, runs the color adaptation algorithm allowing pixels with data transmitted to the screen by the central avionics computer to be displayed on the screen in the night vision imaging system (NVIS) reference coordinate range provided in the MIL STD-3009 standard. Predetermined reference wavelength values are determined according to night vision imaging system (NVIS) reference coordinate values within the value range specified in MIL STD-3009 standards.

BRIEF DESCRIPTION OF THE SEVERAL VIEWS OF THE DRAWING(S)

The display system realized to achieve the object of the present invention is illustrated in the attached drawings, in which.

DESCRIPTION OF SPECIFIC EMBODIMENTS OF THE INVENTION

Figure 1:
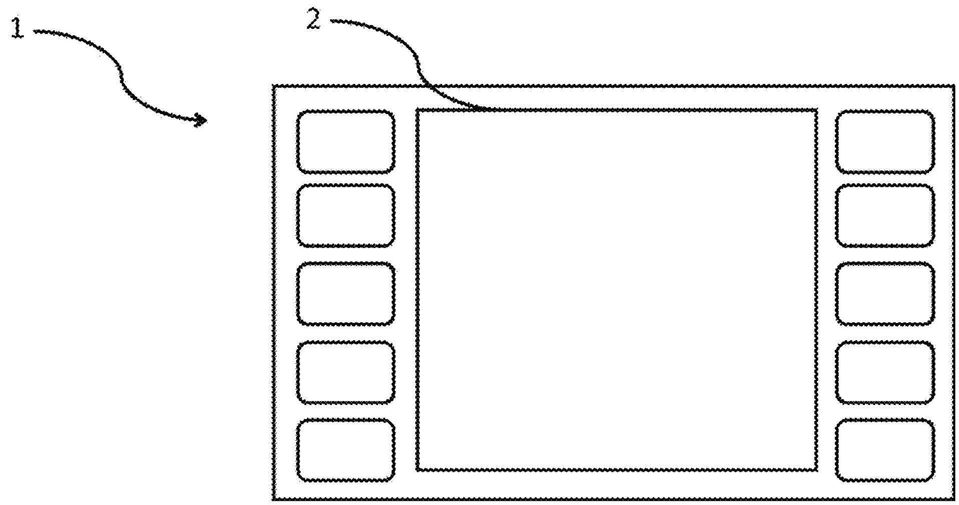
FIG. 1 is a schematic view of the screen.

All the parts illustrated in figures are individually assigned a reference numeral and the corresponding terms of these numbers are listed below:

1. Display System
2. Screen
3. Programmable Logic Tool

The display system (1) comprises at least one screen (2) located at an air and/or space vehicle, and allowing flight data and/or control indicators to be displayed thereon, wherein a day mode or a night mode is created on the screen (2) at a predetermined wavelength value; at least one programmable logic tool (3) located in connection with the screen (2), enabling the flight data to be displayed on the screen (2) in day mode or night mode when the user switches to day mode or night mode, and enabling the wavelength values of the pixels on the screen (2) to be determined in the RGB color space.

The display system (1) according to the invention comprises the programmable logic tool (3) which converts RGB color space wavelength values into wavelength values in the CIE 1976 UCS space when switching to night mode by the user, and calculates an average of the converted wavelength values and the wavelength values in the reference CIE 1976 UCS space predetermined by the manufacturer, so that pixel wavelength values in CIE 1976 UCS space are brought to the reference wavelength value range, and pixel wavelength values are converted back to wavelength values in RGB color space coordinates.

Figure 4:
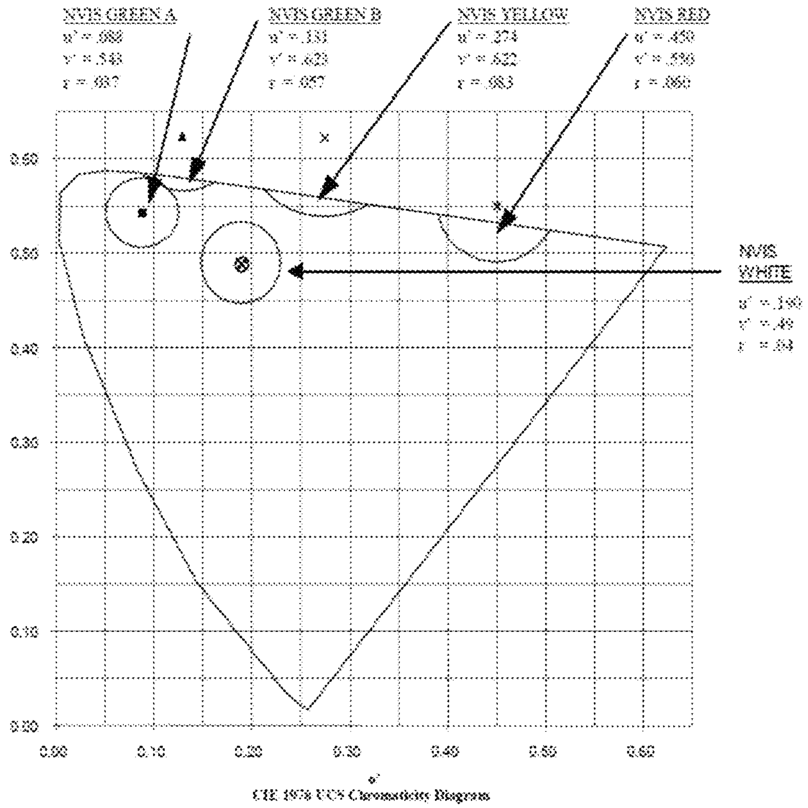
FIG. 4 is a limits chart for MIL-STD 3009 NVIS reference color wavelength.

Flight data or data related to control indicators transmitted by avionic computers in air and/or space vehicles can be viewed by the pilot via the screen (2). A switch controlled by the pilot to determine the day and night mode of air vehicle, e.g. an aircraft or a helicopter, is located in the cockpit. In order for the pilot to read the data more easily when the user switches from day mode to night mode, by means of the programmable logic tool (3), the pixels reflected on the screen (2) and/or on the lighting equipment in the cockpit can be converted to comply with the night mode standard wavelength values. Depending on the function of the equipment in the cockpit, the wavelength values complying with the standards, which must be reflected in night mode, vary. Coordinates of the wavelength values of the pixels of the data transmitted by the central avionics computer are determined in RGB color space by means of the programmable logic tool (3) (FIG. 1, FIG. 4).

When the user switches to night mode, wavelength values in the RGB color space of the data transmitted to the screen (2) by the central avionics computer are converted into the corresponding wavelength coordinate values in the CIE 1976 UCS space. Therefore, it can be determined whether the wavelength values of the pixels are within the night mode reference wavelength value range in the CIE 1976 UCS space predetermined by the manufacturer. If the wavelength values of the pixels converted from RGB color space to CIE 1976 UCS space are not within the reference value range predetermined by the manufacturer, the image processing algorithm is used by the programmable logic tool (3), averages of said values are calculated so as to be brought to the wavelength reference value range, and based on those wavelength coordinate values, they are converted back into RGB color space wavelength values. Thus, when the air and/or space vehicle is switched to night mode, pixels of the data transmitted from the central avionics computer can be processed and reflected on the screen (2) in accordance with the standard predetermined by the manufacturer.

In an embodiment of the invention, the display system (1) comprises the programmable logic tool (3) which, as a result of the user switching from day mode to night mode, processes the color adaptation algorithm consisting of the steps of:

detecting that the air and/or space vehicle has switched from day to night mode (301);

determining RGB color space chromatic wavelength coordinate values by analyzing almost each pixel of the data transmitted from the central avionics computer to the screen (2) (302);

converting the RGB color space coordinate value of almost each pixel into CIE 1976 UCS (u', v') space chromatic wavelength values (303);

calculating an average of the chromatic coordinates of the pixels determined in CIE 1976 UCS space and the reference CIE 1976 UCS (u', v') coordinates predetermined by the manufacturer, thereby correlating the coordinate values of the pixels in the CIE 1976 UCS (u', v') space to fall within to the reference CIE 1976 UCS (u', v') chromatic coordinate value range (304);

as a result of the correlation, converting the pixels, which are brought to the reference chromatic coordinates predetermined by the manufacturer in the CIE 1976 UCS (u', v') space, into RGB color space wavelength coordinates (305); displaying, on the screen (2), almost each pixel converted to RGB color space chromatic coordinate values, at a night mode chromatic color value range predetermined by the manufacturer (306).

Figure 3:
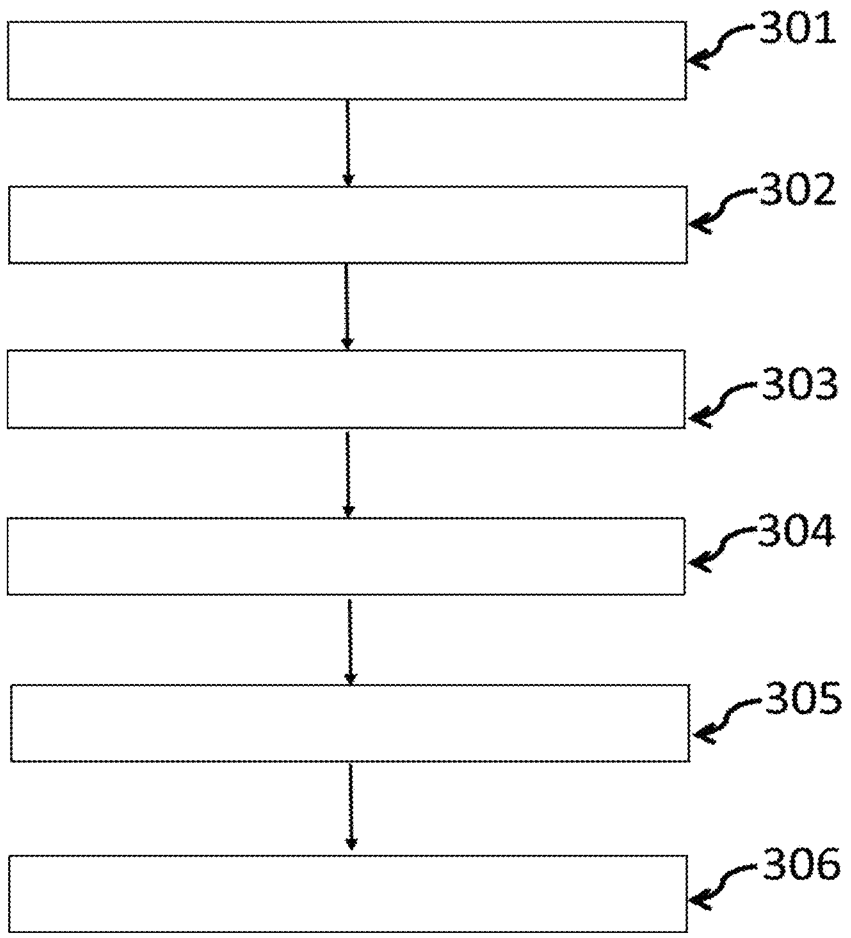
FIG. 3 is a flow diagram of the color adaptation algorithm.

The color adaptation algorithm run in the programmable logic tool (3) calculates the conversion from RGB color space to CIE 1976 UCS (u', v') space using RGB color space wavelength values, while the color brightness Y' and U, V values of the pixels are calculated according to the differentiation rate of the Y' value according to blue (B) and red (R). An average of the wavelength values in the CIE 1976 UCS (u', v') space corresponding to the first wavelength values in the RGB color space of the pixels of the data transmitted from the central avionics computer, and of the coordinates of reference wavelength values predetermined by the manufacturer are calculated, so that the coordinate values of the pixels are brought to the reference CIE 1976 UCS (u', v') space wavelength coordinate value range predetermined by the manufacturer. Therefore, pixels with wavelength values brought to the reference range in CIE 1976 UCS (u', v') space are converted back to RGB color space, and reflected on the screen (2) in night mode with their secondary wavelength values. The color adaptation algorithm is run for almost each pixel via the programmable logic tool (3) (FIG. 3).

In an embodiment of the invention, the display system (1) comprises the programmable logic device (3) that detects when the air and/or space vehicle is switched from day mode to night mode by the user, thereby running the color adaptation algorithm. In this way, the data created by the central avionics computer in the air vehicle and transmitted to the user is processed by the programmable logic tool (3) and reflected on the screen (2) in accordance with the night mode.

In an embodiment of the invention, the display system (1) comprises the programmable logic tool (3) which, as a result of the user switching to night mode, runs the color adaptation algorithm without using an external lighting device on the screen (2), so that the data reflected on the screen (2) are displayed in CIE 1976 UCS (u', v') space, at the reference wavelength coordinate range of white night vision imaging system, green night vision imaging system, yellow night vision imaging system or red night vision imaging system. Thanks to the color adaptation algorithm run by the programmable logic tool (3), when the air vehicle is switched to night mode by the user, the data transmitted by the central avionics computer can be reflected on the screen (2) in CIE 1976 UCS (u', v') space coordinates using only the digital design technique, at the reference wavelength range of the white night vision imaging system, green night vision imaging system, yellow night vision imaging system, or red night vision imaging system. Therefore, any external lighting device (backlight/lighting filter) is not required around the screen (2).

Figure 2:
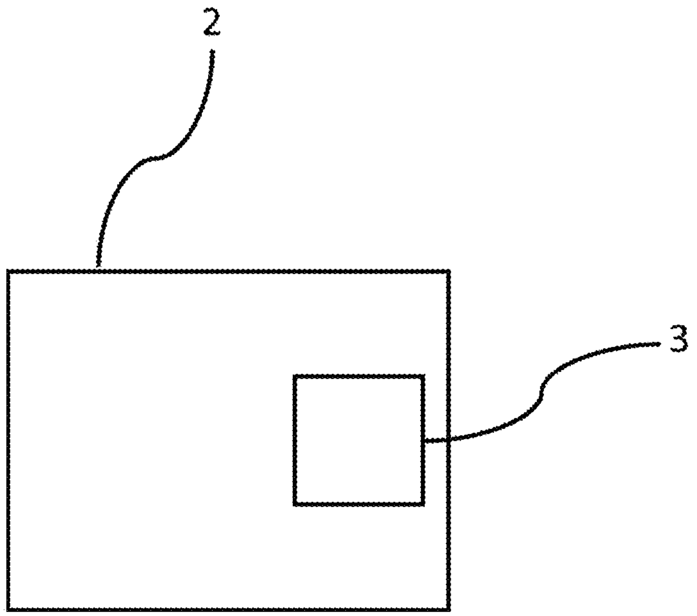
FIG. 2 is a schematic view of the programmable logic tool.

In an embodiment of the invention, the display system (1) comprises the programmable logic tool (3), which is solely a field-programmable gate array (FPGA). By means of the field-programmable gate array that processes the pixels on the screen (2) in daytime mode in accordance with the daytime mode; when switching to night mode, the color adaptation algorithm is run and pixels suitable for night mode are applied to the screen (2) (FIG. 2).

In an embodiment of the invention, the display system (1) comprises the programmable logic tool (3) that runs the color adaptation algorithm created using the hardware description language (HDL), thus allowing the creation of pixels on the screen (2) in night mode at a reference brightness and color value range predetermined by the manufacturer.

In an embodiment of the invention, the display system (1) comprises the screen (2), which is a liquid crystal display (LCD), large area display (LAD), multi-function display (MFD), head-up display or integrated matrix device (IMD) allowing the user to display flight data in the cockpit. When the air vehicle is switched to night mode by the user, data collected by the central avionics computer from various sources are treated to image processing via the programmable logic tool (3), and transmitted to the user for display.

In an embodiment of the invention, the display system (1) comprises the programmable logic tool (3) that allows the pixels on the screen (2) to be displayed at the night vision imaging system (NVIS) reference coordinate range in the MIL STD-3009 standard, when the air and/or space vehicle is switched to night mode (N). Depending on the function of the equipment in the cockpit, wavelength values complying with the standards that must be reflected in night mode vary. For example, the lighting on the bezel keys is expected to comply with NVIS green (NVIS Green), while lighting such as warning lights may be NVIS red or NVIS yellow. Alphanumeric monochrome LCDs are expected to comply with NVIS Green. Multi-Color LCDs are expected to comply with NVIS White wavelength standards. Wavelengths of pixels created by data collected from various sources by the central avionics computer can be adjusted, via the color adaptation algorithm operated through the programmable logic tool (3), to wavelength values complying with the military night imaging standards (MIL-STD 3009) determined by the manufacturer (FIG. 4).

The invention claimed is:

1. A display system (1) comprising at least one screen (2) located at an air and/or space vehicle, and allowing flight data and/or control indicators to be displayed thereon, wherein a day mode or a night mode is created on the screen (2) at a predetermined wavelength value; at least one programmable logic tool (3) located in connection with the screen (2), enabling the flight data to be displayed on the screen (2) in the day mode or the night mode when the user switches to the day mode or the night mode, and enabling the wavelength values of the pixels on the screen (2) to be determined in the RGB color space, wherein the programmable logic tool (3) which converts the RGB color space wavelength values into wavelength values in the CIE 1976 UCS color space when switching to the night mode by the user, and calculates an average of the converted wavelength values and the wavelength values in a reference CIE 1976 UCS color space predetermined by a display system manufacturer, so that the converted pixel wavelength values in CIE 1976 UCS color space are brought to the reference CIE 1976 UCS color space wavelength value range, and the brought pixel wavelength values are converted back to wavelength values in RGB color space to be reflected on the display in the night mode coordinates.

2. A display system (1) according to claim 1, wherein the programmable logic tool (3) which, as a result of the user switching from the day mode to the night mode, processes a color adaptation algorithm consisting of the steps of:

detecting that the air and/or space vehicle has switched from day to night mode (301);

determining RGB color space chromatic wavelength coordinate values by analyzing almost each pixel of the data transmitted from a central avionics computer to the at least one screen (2) (302);

converting the RGB color space chromatic wavelength coordinate value of almost each pixel into CIE 1976 UCS (u', v') space chromatic wavelength values (303);

calculating an average of chromatic coordinates of the pixels determined in CIE 1976 UCS space and the reference the CIE 1976 UCS (u', v') space wavelength values predetermined by the display system manufacturer, thereby correlating coordinate values of the pixels in the CIE 1976 UCS (u', v') space to fall within a reference CIE 1976 UCS (u', v') space chromatic coordinate value range (304);

as a result of the correlation, converting the pixels, which are brought to the reference chromatic coordinate value range predetermined by the display system manufacturer in the CIE 1976 UCS (u', v') space, into RGB color space wavelength coordinates (305);

displaying, on the screen (2), almost each pixel converted to RGB color space chromatic coordinate values, at a night mode chromatic color value range predetermined by the display system manufacturer (306).

3. A display system (1) according to claim 1, wherein the programmable logic device (3) that detects when the air and/or space vehicle is switched from the day mode to the night mode by the user, thereby running the color adaptation algorithm.

4. A display system (1) according to claim 1, wherein the programmable logic tool (3) which, as a result of the user switching to the night mode, runs the color adaptation algorithm without using an external lighting device on the screen (2), so that the data reflected on the screen (2) are displayed in the CIE 1976 UCS (u', v') space, at the reference wavelength coordinate range of white night vision imaging system, green night vision imaging system, yellow night vision imaging system or red night vision imaging system.

5. A display system (1) according to claim 1, wherein the programmable logic tool (3), which is solely a field-programmable gate array (FPGA).

6. A display system (1) according to claim 1, wherein the programmable logic tool (3) that runs the color adaptation algorithm created using a hardware description language (HDL), thus allowing the creation of pixels on the screen (2) in the night mode at a reference brightness and the color value range predetermined by the display system manufacturer.

7. A display system (1) according to claim 1, wherein the screen (2), which is a liquid crystal display (LCD), a large area display (LAD), a multi-function display (MFD), a head-up display or an integrated matrix device (IMD) allowing the user to display the flight data in a cockpit.

8. A display system (1) according to claim 1, wherein the programmable logic tool (3) that allows the pixels on the screen (2) to be displayed at a night vision imaging system (NVIS) reference coordinate range in a MIL STD-3009 standard, when the air and/or space vehicle is switched to the night mode (N).

* * * * *